United States Patent [19]

Muller et al.

[11] Patent Number: 4,701,893
[45] Date of Patent: Oct. 20, 1987

[54] ULTRASONIC RANGING SYSTEM

[75] Inventors: Lon J. Muller, Groveland; Austin Franklin, Littleton, both of Mass.; Robert W. George, II, Windham, N.H.

[73] Assignee: Denning Mobile Robotics, Inc., Woburn, Mass.

[21] Appl. No.: 864,002

[22] Filed: May 16, 1986

[51] Int. Cl.$^4$ ............................ G01V 9/66; H04B 1/02
[52] U.S. Cl. ...................................... 367/87; 367/137; 367/903
[58] Field of Search ................. 367/87, 137, 903, 135

[56] References Cited

U.S. PATENT DOCUMENTS

| | | | |
|---|---|---|---|
| 3,613,068 | 10/1971 | Thompson et al. | 367/903 |
| 3,742,442 | 6/1973 | Leyde et al. | 367/96 |
| 4,274,503 | 6/1981 | Mackintosh | 180/23 |
| 4,336,605 | 6/1982 | Vancha | 367/903 |
| 4,357,690 | 11/1982 | Kuroda et al. | 367/87 |
| 4,451,909 | 5/1984 | Kodera et al. | 367/99 |
| 4,463,821 | 8/1984 | Drimuble | 180/168 |
| 4,500,970 | 2/1985 | Daemmer | 364/513 |

FOREIGN PATENT DOCUMENTS 60-63698  4/1985  Japan .

OTHER PUBLICATIONS

Kujiwara, T.; "Development of a Mobile Robot for Security Guard".
"Towards Autonomous Vehicles", 1984 Annual Research Report, Robotics Institute, Carnegie-Mellon University, pp. 33-49, (1985).

*Primary Examiner*—Thomas H. Tarcza
*Assistant Examiner*—Daniel T. Pihulic
*Attorney, Agent, or Firm*—Joseph S. Iandiorio; Douglas E. Denninger

[57] ABSTRACT

An ultrasonic ranging system includes transformer means with a transformer which is selectively energized to produce a transducer drive signal. An ultrasonic transducer transmits an ultrasonic pulse in response to the drive signal and develops an echo signal upon receipt of an echo pulse derived from the ultrasonic pulse; a shunt switch is connected across a winding of the transformer and is selectively closed to quickly damp the ringing following the transmission of an ultrasonic pulse to a level substantially below the level of the echo signal to permit close ranging.

14 Claims, 11 Drawing Figures

ULTRASONIC RANGING SYSTEM

FIELD OF INVENTION

This invention relates to an ultrasonic ranging system capable of use in vehicles and mobile robots, and more particularly to such a system which provides very close ranging.

CROSS-REFERENCES

The following applications, filed concurrently herewith, are incorporated herein by reference:

| Inventors | Title | Ser. No. |
| --- | --- | --- |
| Maddox et al. | Intrusion Detection System | 864,032 filed 5/16/86 |
| Benayad-Cherif et al. | Position Locating System for Vehicle | 864,031 filed 5/16/86 |
| Pavlak et al. | Power-Up Sequencing Apparatus | 864,590 filed 5/16/86 |
| Maddox et al. | Beacon Proximity Detection System for Vehicle | 864,292 filed 5/16/86 |
| Kadonoff et al. | Orientation Adjustment System and Robot Using Same | 864,450 filed 5/16/86 |
| Kadonoff et al. | Obstacle Avoidance System | 864,585 filed 5/16/86 |
| Kadonoff et al. | Beacon Navigation System and Method for Guiding a Vehicle | 864,442 filed 5/16/86 |
| George II et al. | Recharge Docking System for Mobile Robot | 864,028 filed 5/16/86 |

BACKGROUND OF INVENTION

There are available ranging system such as that used in Polaroid cameras. These are accurate and dependable devices but are not suitable for close ranging, e.g. distances of two or three inches, although they are dependable for distances of nine inches or more. In many applications that is adequate, but not in mobile robots, for robots often must pass through doorways with only two or three inches of clearance on either side. Such close ranging is also required when mobile robots are operating in obstacle avoidance modes since there may be little room to carry out the avoidance path. Further, avoidance maneuvers should minimize diversion from the designated path. One reason close ranging is not obtained with present ultrasonic systems is that at close range the output pulse is so long that it overlaps the returning echo pulse. Even if the output pulse were shortened, the output pulse would still overlap the returning echo pulse because of the ringing following the end of the output pulse. In one device the echo signal generated by the returning echo pulse is in the neighborhood of 100 millivolts. But the bias on the circuit necessary to set the transducer to respond to the echo pulse is approximately 150 volts, 300 volts peak to peak. Thus even the smallest ringing will overpower the echo signal. In fact, a dual-diode clamping circuit is used to pull the 150 volts down to the breakdown voltage of the diode, i.e. 0.7 volts. But that is 700 millivolts, more than enough to overpower the 100 millivolt echo signal. Present systems require 50 microseconds to bring the ringing voltage from 300 volts peak to peak to 0.7 volts, and an additional 500–600 microseconds to bring it to the one millivolt range.

SUMMARY OF INVENTION

It is therefore an object of this invention to provide an improved ultrasonic ranging system.

It is a further object of this invention to provide an improved multichannel ultrasonic ranging system.

It is a further object of this invention to provide an improved ultrasonic ranging system for a vehicle such as a mobile robot.

It is a further object of this invention to provide an ultrasonic ranging system for extremely close ranging.

It is a further object of this invention to provide an ultrasonic ranging system which uses a much shorter output pulse.

It is a further object of this invention to provide an ultrasonic ranging system which damps all ringing well below the level of the echo signal.

It is a further object of this invention to provide an ultrasonic ranging system which damps all ringing well below the level of the echo signal very quickly, before the echo signal occurs.

The invention results from the realization that a truly effective short-range ranging system can be achieved by selectively shunting a winding of the drive transformer to quickly damp the ringing following the transducer drive signal so that a clear, early, window is available for the quickly returning short-range echo signal.

This invention features an ultrasonic ranging system including a transformer xeans and means for selectively energizing the transformer means to produce a transducer drive signal. There is an ultrasonic transducer for transmitting an ultrasonic pulse in response to the drive signal and for developing an echo signal upon receipt of an echo pulse derived from the ultrasonic pulse. There are damping means including a shunt switch connected across a winding of the transformer, and there are means for selectively closing the shunt switch and quickly damping the ringing following the transmission of an ultrasonic pulse to a level substantially below the level of the echo signal to permit close ranging.

In a preferred embodiment, the shunt switch is connected with the low-voltage winding of the transformer and the transducer is coupled to the high-voltage winding of the transformer. There may be clamping means for clamping the high-voltage winding to close to ground level and the level of the echo signal.

The system also includes means for generating a range signal from the echo signal. The means for generating a range signal may include an integrating circuit for integrating the echo signal, a comparator for providing a reset signal when the integrating circuit output reaches a predetermined level, and a gating circuit which is set by the drive signal and reset by the comparator when the output of the integrating circuit reaches the predetermined level in order to provide a range signal defined by the set and reset times.

The ultrasonic ranging system may be one channel of a multichannel system, and the entire system may be included on a vehicle or mobile robot. The output pulse may be a single pulse or may contain a number of segments.

DISCLOSURE OF PREFERRED EMBODIMENT

Other objects, features and advantages will occur from the following description of a preferred embodiment and the accompanying drawings, in which.

Figure 1:
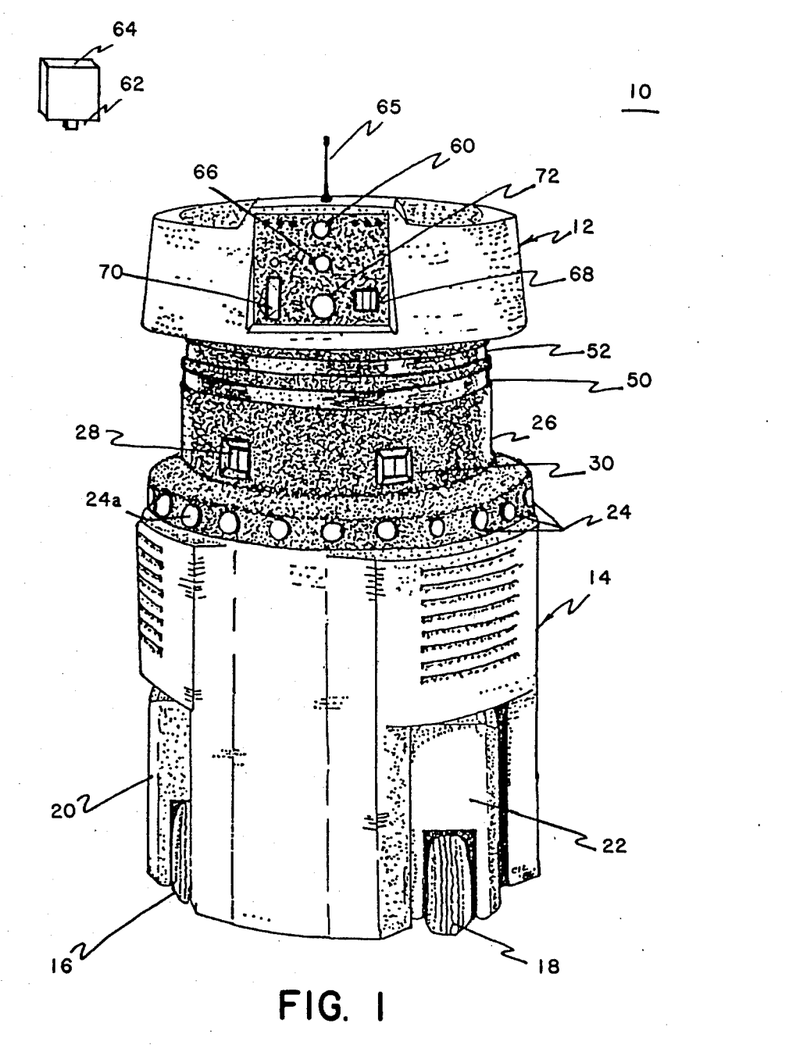
FIG. 1 is an axonometric view of a robot incorporating the ultrasonic ranging system according to this invention.

There is shown in FIG. 1 a vehicle, robot 10 according to this invention including a head section 12 and a base 14 movable on three wheels, only two of which, 16, 18, are visible. The wheels are mounted in three steerable trucks, only two of which, 20 and 22, are visible. There are twenty-four ultrasonic transducers 24 such as the electrostatic transducer of the Sell type available from Polaroid, equally spaced at fifteen degrees around the periphery of ring 25 on base 14. Above that on reduced neck 26 there are located six passive infrared motion detectors 28, 30, 32, 34, 36, 38, only two of which, 28 and 30, are shown. These detectors are equally spaced at sixty degrees apart and may be DR-321's available from Aritech. Just above that are two conductor bands 50 and 52 which are used to engage a charging arm for recharging the robot's batteries. Head section 12 is mounted to base 14 and rotates with respect to base 14 about a central vertical axis. Head section 12 carries an RF antenna 65 for sending and receiving communication signals to a base location or guard station. Head section 12 also includes an infrared sensor 68 for sensing radiation in the near infrared region, e.g. 904 nanometers, such as emitted from LED 62 of beacon 64, one or more of which are mounted on the walls in the space to be protected by robot 10 to assist in locating and directing robot 10 in the area in which it is to patrol. An ultrasonic transducer 66 similar to the transducer 24 used for maneuvering and avoidance may be provided for ranging. There is also provided a passive infrared sensor 68 similar to sensors 28-38. A microwave transmission and reception antenna 70 and a TV camera 72 which may be turned on when an apparent intrusion has occurred are also included in head 12.

Figure 2:
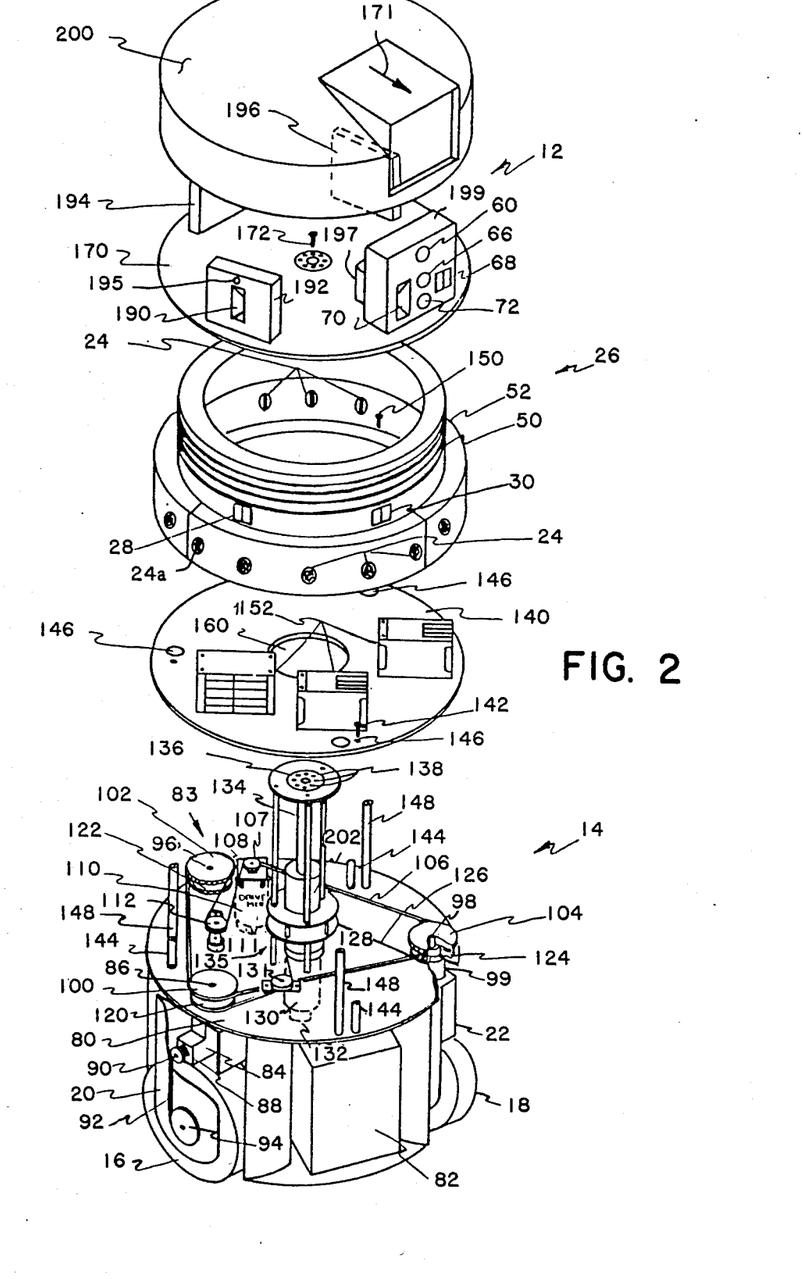
FIG. 2 is a simplified exploded view with parts removed of the robot of FIG. 1.

Base 14, FIG. 2, includes a main chassis 80 which carries three batteries 82 such as Globe 12V 80AH Gel Cells, only one of which is shown. When fully charged they will operate the robot for twelve hours or more. Trucks 20 and 22, with wheels 16 and 18 respectively, are suspended from chassis 80. Each truck as indicated at truck 20 includes a right-angle drive 84 which receives input from vertical drive shaft 86 and provides output on horizontal drive shaft 88, which operates pulley 90, which in turn through belt 92 drives pulley 94 attached to the axle of wheel 16. Vertical drive shaft 86 and counterpart drive shafts 96 and 98 are driven by their respective sprockets or pulleys 100, 102, 104 which in turn are driven by endless belt 106 powered by the pulley 107 on output shaft 108 of drive motor 110 mounted beneath chassis 80. An encoder 111 mounted with motor 110 monitors the velocity of the robot. An idler wheel 112 is provided to maintain proper tension on belt 106. Three additional shafts, only one of which, 99, is shown, concentric with shafts 86, 96 and 98, respectively, are driven by a second set of pulleys or sprockets 120, 122, 124 engaged with drive belt 126 powered by sprocket 128 driven by steering motor 130 mounted beneath chassis 80. Idler pulley 131 is used to maintain tension on belt 126. An encoder 132 is associated with steering motor 130 to provide outputs indicative of the steering position. The steering motor shaft is connected through pulley 128 to extension shaft 134, the top of which is provided with a flange 136 with a plurality of mounting holes 138. Electronic chassis 140 is mounted by means of screws 142 on three shorter standoffs 144. Three holes 146 in electronic chassis 140 accommodate the pass-through of longer standoffs 148, which mount neck 26 by means of screws 150. Electronic chassis 140 contains all of the electronic circuit boards and components such as indicated at items 152 that are contained in the base 14, including the status module described infra.

When an electronic chassis 140 and neck 26 are mounted on their respective standoffs, extension shaft 134 and flange 136 and the associated structure are accommodated by the central hole 160 in electronic chassis 140 and the opening in neck 26 so that the head plate 170 may be mounted by means of screws 172 to threaded holes 138 in flange 136. In this way the entire head rotates in synchronism with the trucks and wheels as they are steered by steering motor 130. In addition to the primary microwave sensor 70 there are three additional microwave sensors 190, 330, 332, only one of which, 190, is visible, spaced at ninety degrees about head plate 170 mounted in housings 192, 194, and 196. Housing 194 which faces directly to the back of the head as opposed to primary microwave sensor 70 which faces front, also contains a second infrared sensor 334, not visible, which is the same as infrared sensor 68. Cover 200 protects the electronics on head plate 170. All of the electrical interconnections between head 12 and base 14 are made through slip rings contained in slip ring unit 202 mounted about extension shaft 134 in base 14.

Figure 3:
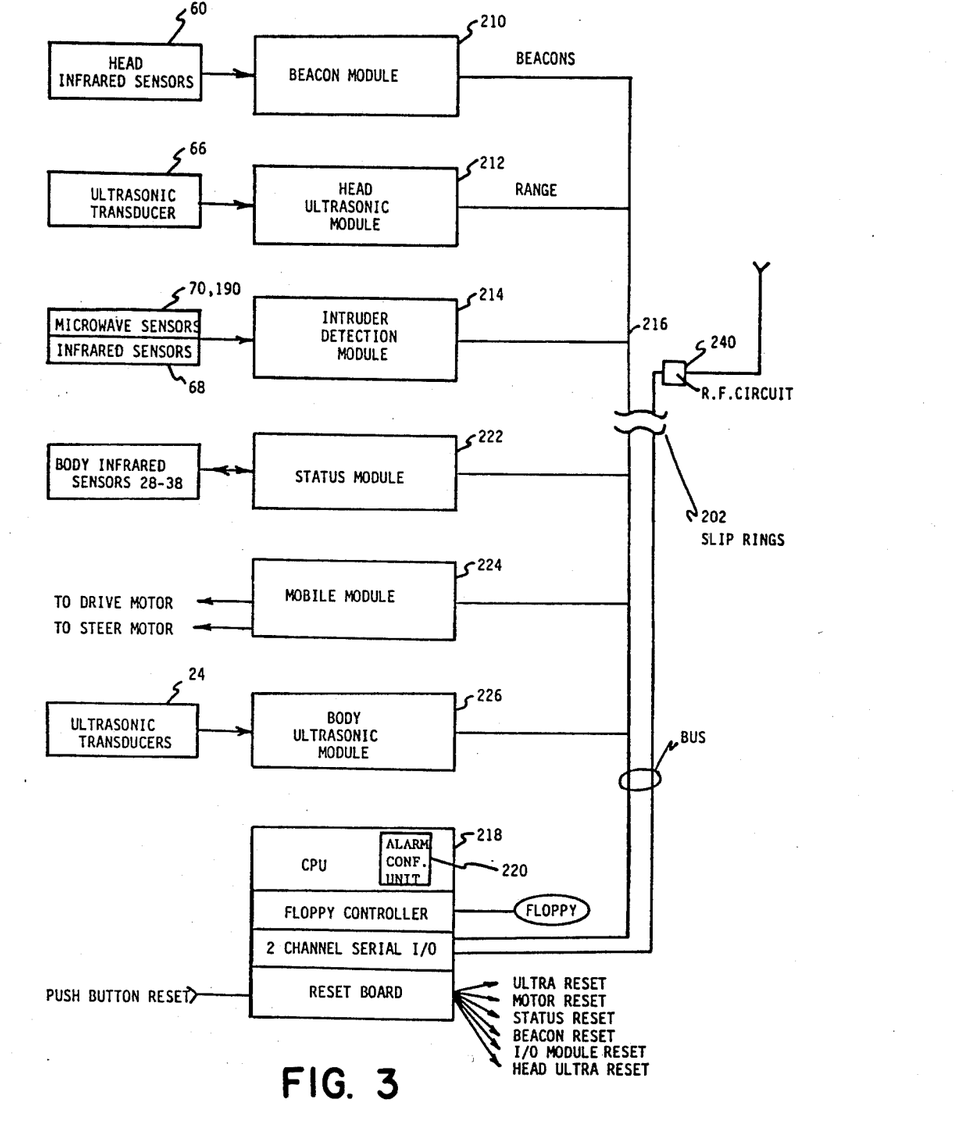
FIG. 3 is a block diagram of the electronic modules included in the robot of FIGS. 1 and 2.

Head 12, FIG. 3, includes three electronic portions: beacon module 210, head ultrasonic module 212, and intrusion detection module 214. Beacon module 210 responds to the head IR sensor 60 to determine what angle the beacon 64 is with respect to the robot. That angle is fed on bus 216 through the slip ring unit 202 to the main CPU 218. Head ultrasonic module 212 responds to ultrasonic transducer 66 to provide ranging information on bus 216 to CPU 218. Intruder detection module 214 responds to the four microwave sensors 70, 190, 330, 332, and the two IR sensors 68, 334 to provide indications as of yet unconfirmed intrusion events. These events are processed by the alarm confirmation unit 220 in CPU 218 to determine whether a true confirmed intrusion has occurred. In the body section 14, there is included status module 222, mobile module 224, body ultrasonics module 226, and CPU 218. Status module 222 responds to the six infrared sensors 28-38 to provide an indication of an intrusion. Status module 222 may also monitor fire and smoke detectors, diagnostic sensors throughout the robot, as well as chemical and odor detectors and other similar sensors. Mobile module 224 operates and monitors the action of drive motor 110 and steering motor 130. The twenty-four ultrasonic transducers 24 provide an input to the body of ultrasonic module 226, which guides the movement and obstacle avoidance procedures for the robot. Finally, body 14 contains CPU 218, which in addition to the alarm confirmation unit 220 also interconnects with a floppy disk controller, two-channel serial I/O boards, and a reset board which receives inputs from a pushbutton reset and CPU 218 and outputs ultrasonic resets, motor resets, status resets, beacon resets, I/O module resets and head ultrasonic resets. CPU 218 also receives inputs from RF antenna 65 through RF circuit 240.

Figure 4A:
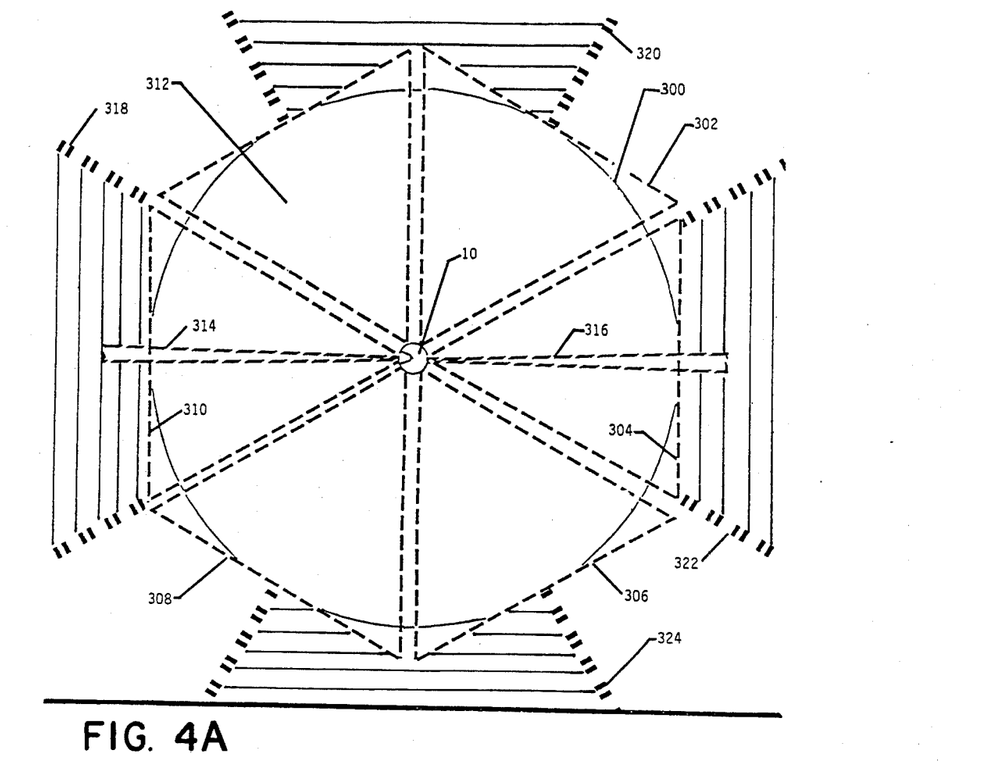
FIG. 4A is a plan view of the fields of view of the ultrasonic, infrared and microwave sensors of the robot of FIG. 1.
Figure 4B:
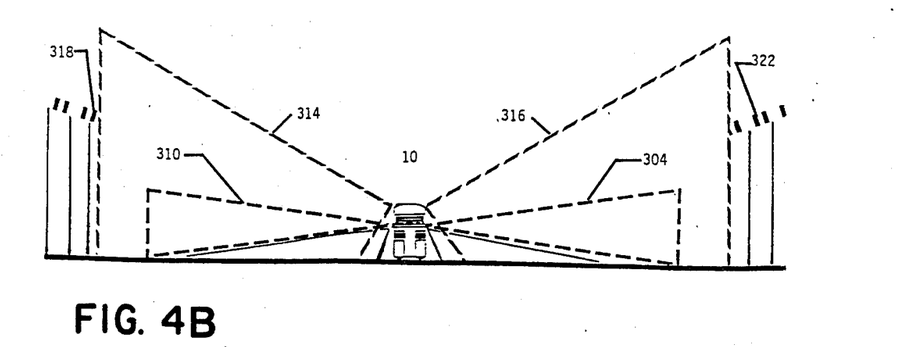
FIG. 4B is a side elevational view taken along line 4B of FIG. 4A showing the vertical profile of the fields of view.

A top plan view of the fields of view of the various sensors and transducers is shown in FIG. 4A. The twenty-four ultrasonic transducers 24 have a complete 360° field of view 300. The six infrared sensors 28, 30, 32, 34, 36, 38, on body 14 provide six triangular fields of view 302, 304, 306, 308, 310 and 312. The two infrared sensors 68 and 334 on head 12 provide the narrower fields of view 314 and 316, and the four microwave transducers 70, 190, 330, 332 provide the four fields of view 318, 320, 322 and 324. The vertical profile of these fields is depicted in FIG. 4B. The field of view of the microwave transducers extends approximately one hundred fifty feet. That of the infrareds in the head extend about thirty feet, those of the infrared in the body about five feet, and the ultrasonics in the body also extend about twenty-five feet.

Figure 5A:
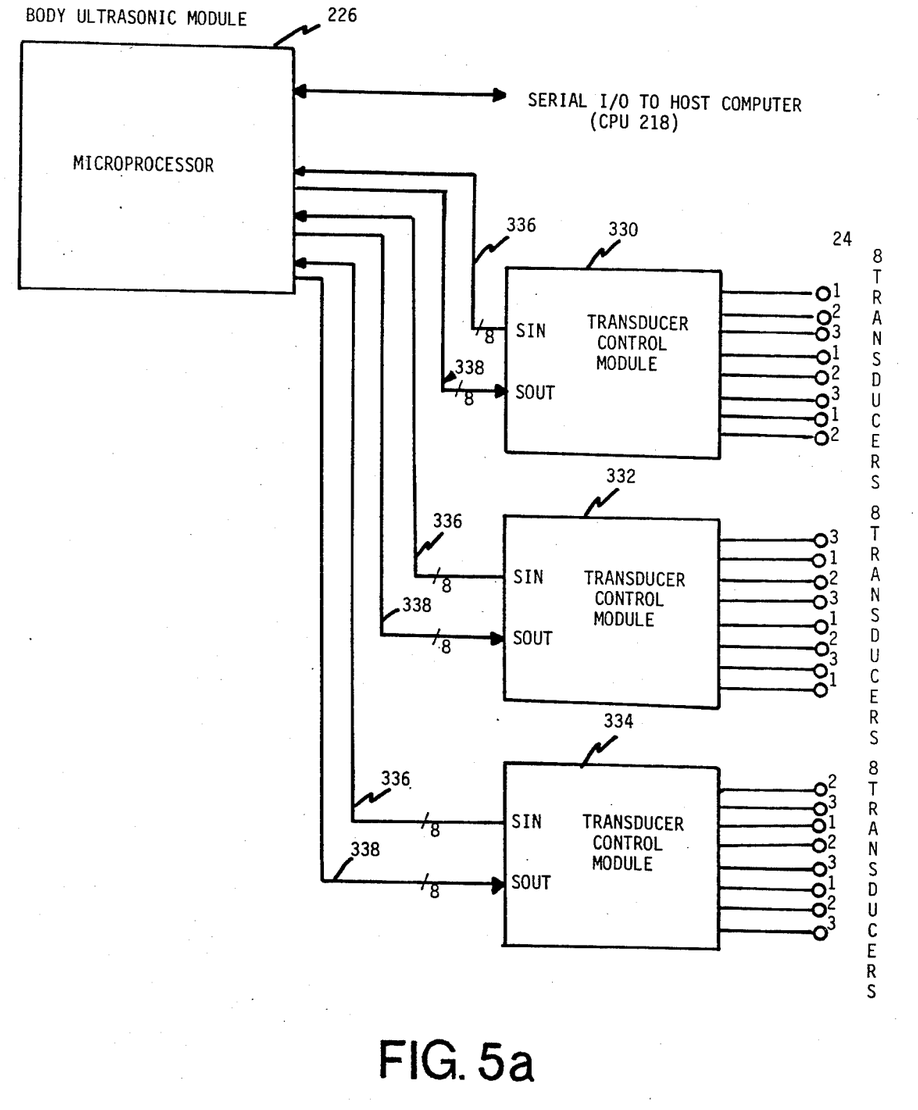
FIG. 5A is a schematic block diagram of the body ultrasonic module of FIG. 3, the transducer control modules and ultrasonic transducers.

The ultrasonic ranging system according to this invention includes body ultrasonic module 226, FIG. 5A, which includes a microprocessor such as a Z80, and three transducer control modules 330, 332 and 334, each of which drives a group of eight ultrasonic transducers 24. Module 226 communicates through serial I/O with the host computer, CPU 218, FIG. 3, and communicates through eight-conductor cables to the input (SOUT) 338 and the output (SIN) 336 of each transducer control module. Although each transducer control module controls a group of eight transducers 24, the transducers are actually operated in banks which are distributed across all three of the transducer control modules. Thus each transducer with the number 1 next to it is in bank 1; transducers with a 2 next to them are in bank 2; and those with a 3 next to them are in bank 3. When bank 1 is to be fired, instructions are sent through cable 338 to energize those transducers in the particular bank to be energized.

Figure 5B:
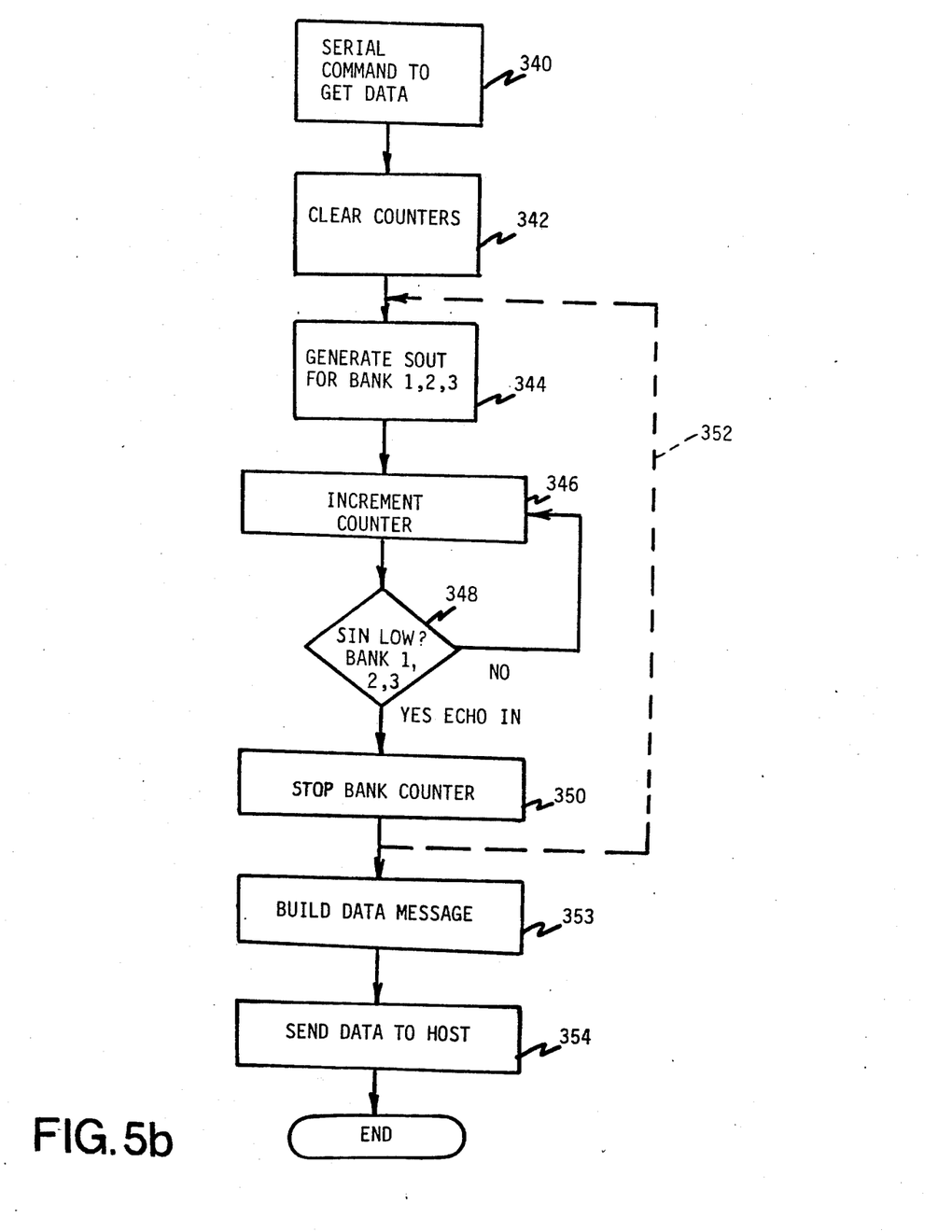
FIG. 5B is a flow chart of the software which controls the microprocessor in the body ultrasonic module.

The operation is controlled by software in the microprocessor in module 226. A serial command to get data in step 340, FIG. 5B, coming from CPU 218 to microprocessor 226 causes the counters to be cleared in the next step 342 and a SOUT signal to be generated in step 344. The SOUT will be provided for only one of the three banks, for example, bank 1. The increment counter is incremented in step 346, and the question is asked in step 348: Is SIN low? If SIN is not low, that means no echo has been received and the system returns to step 346. If the SIN is low, that means the echo has returned and ranging data is available. Therefore the counter is stopped in step 350. Since this is the first bank the system returns on line 352 to step 344 and the routine is repeated for the second bank. This cycle repeats for the third bank, after which the system in step 353 accumulates the three pieces of echo ranging data derived from the firings of the three banks of transducers and in step 354 sends the data to the host computer, CPU 218.

Figure 6:
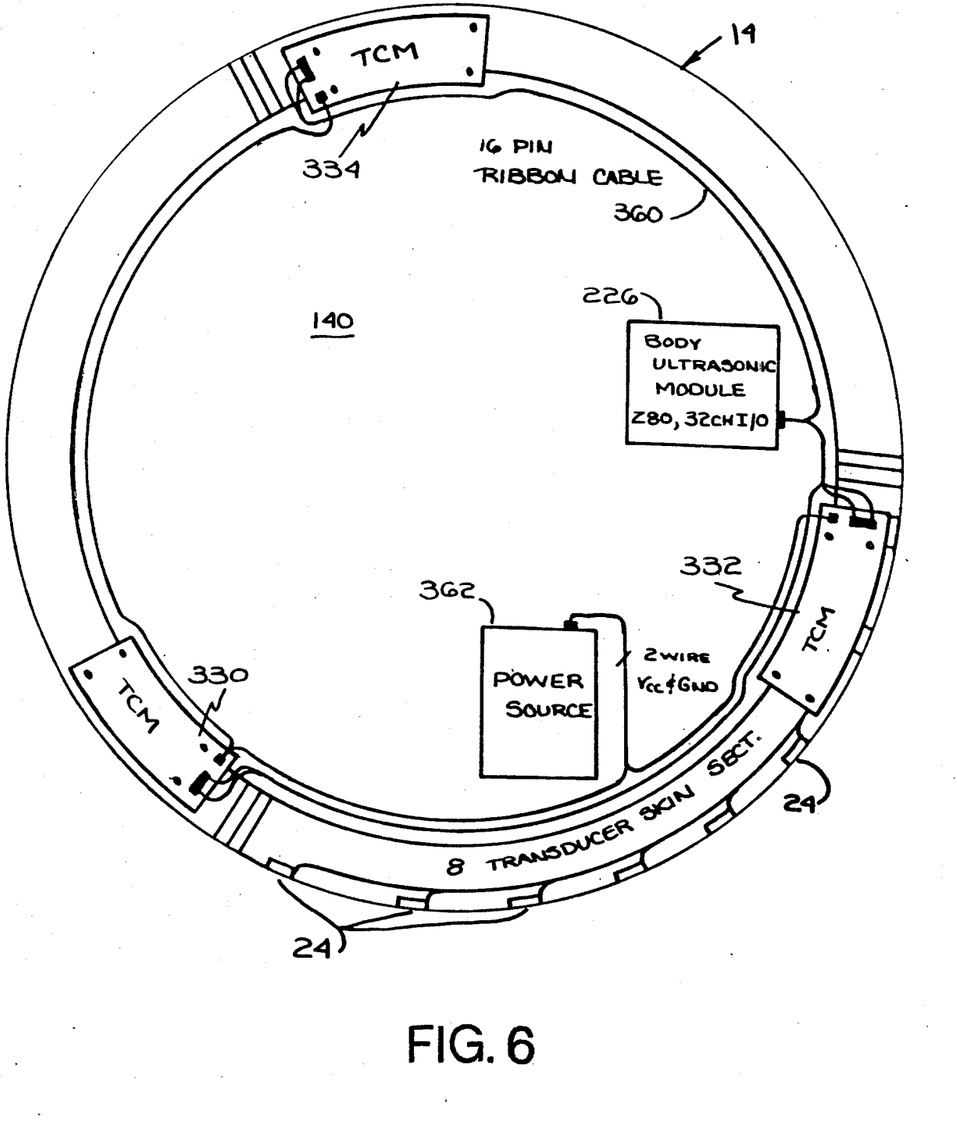
FIG. 6 is a top plan view of the neck and electronics chassis of the robot of FIGS. 1 and 2 showing the location of the transducer control modules, the transducers, the body ultrasonic module, and the power source.

In this specific embodiment the ranging system is mounted on the neck 26 of base 14, FIG. 6, of robot 10, and transducers 24 are mounted on the outside of ring 25. The feed transducer control modules 330, 332 and 334 are also mounted on ring 25. The body ultrasonic module is mounted on electronic chassis 140 and is interconnected with the three transducer control modules by means of a sixteen-pin ribbon 360. Power source 362 is also mounted on electronic chassis 140 and provides voltage $V_{cc}$ and ground through two-wire cable 364 to each of the transducer control modules.

Figure 7A:
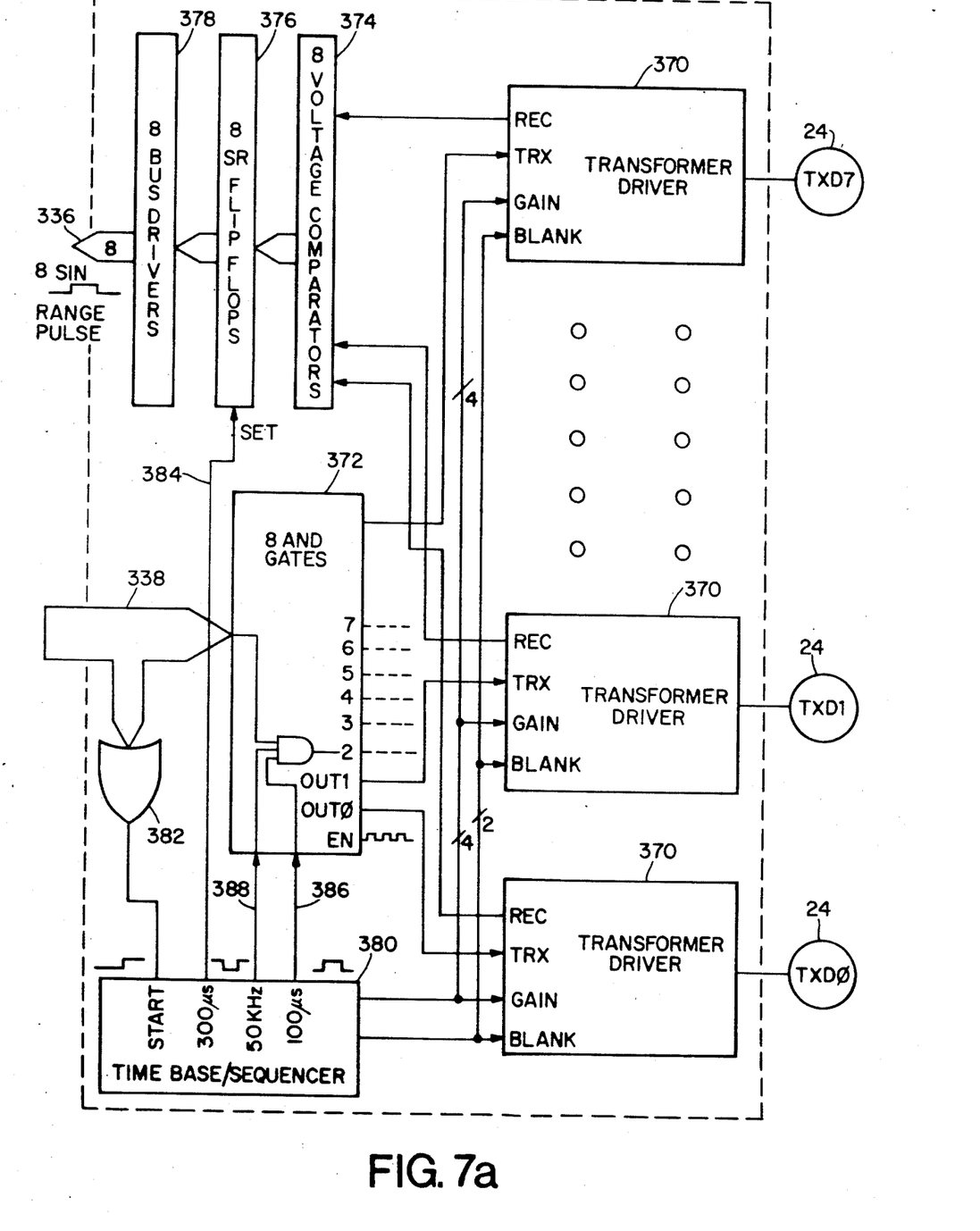
FIG. 7A is a detailed block diagram of a transducer control module shown in FIGS. 5 and 6.

Each transducer control module as illustrated with respect to control module 330 in FIG. 7A includes eight transformer drivers 370, each of which drives a separate one of the eight transducers 24. The entire module is arranged in sets of eight. There are eight three-input AND gates 372, eight voltage comparators 374, eight flip-flops 376, and eight bus drivers 378. There is also a time base sequencer 380 and an OR gate 382. When an SOUT signal is provided on line 338 identifying a particular one of the eight transformer drivers 370 and transducers 24, one of the three inputs enables the AND gate associated with the identified transducer. At the same time, when any SOUT signal appears on any one of the eight lines, OR gate 382 provides a start signal to time base sequencer 380. This simultaneously provides a signal on line 384 to set all eight flip-flops 376 and also provides a 100 microsecond enabling pulse on line 386 to the second input of the three-input AND gate, so that now the 50 KHz clock pulses on line 388 will be passed through that AND gate and appear on the designated transformer driver at the trigger input TRX. During the 100 microsecond period of the enabling signal on line 386, four 50 KHz pulses will be provided to the TRX input of the identified transformer driver. The drive signal is thus provided to the transducer, which generates an ultrasonic pulse. The ultrasonic pulse strikes a target and the echo returns to the transducer and is received by the transformer driver, which provides the REC signal to the associated one of the eight voltage comparators 374. The returning signal is integrated, and when the integrated function reaches a predetermined level the voltage comparator 374 triggers and resets the associated one of flip-flops 376. The set signal identifies the beginning of the ranging period, the reset pulse defines the end of that period. The range pulse is now provided at the output of bus drivers 336, and that range pulse represents the distance to the target and back again. This signal, identified as SIN, is then returned to the microprocessor.

Figure 7B:
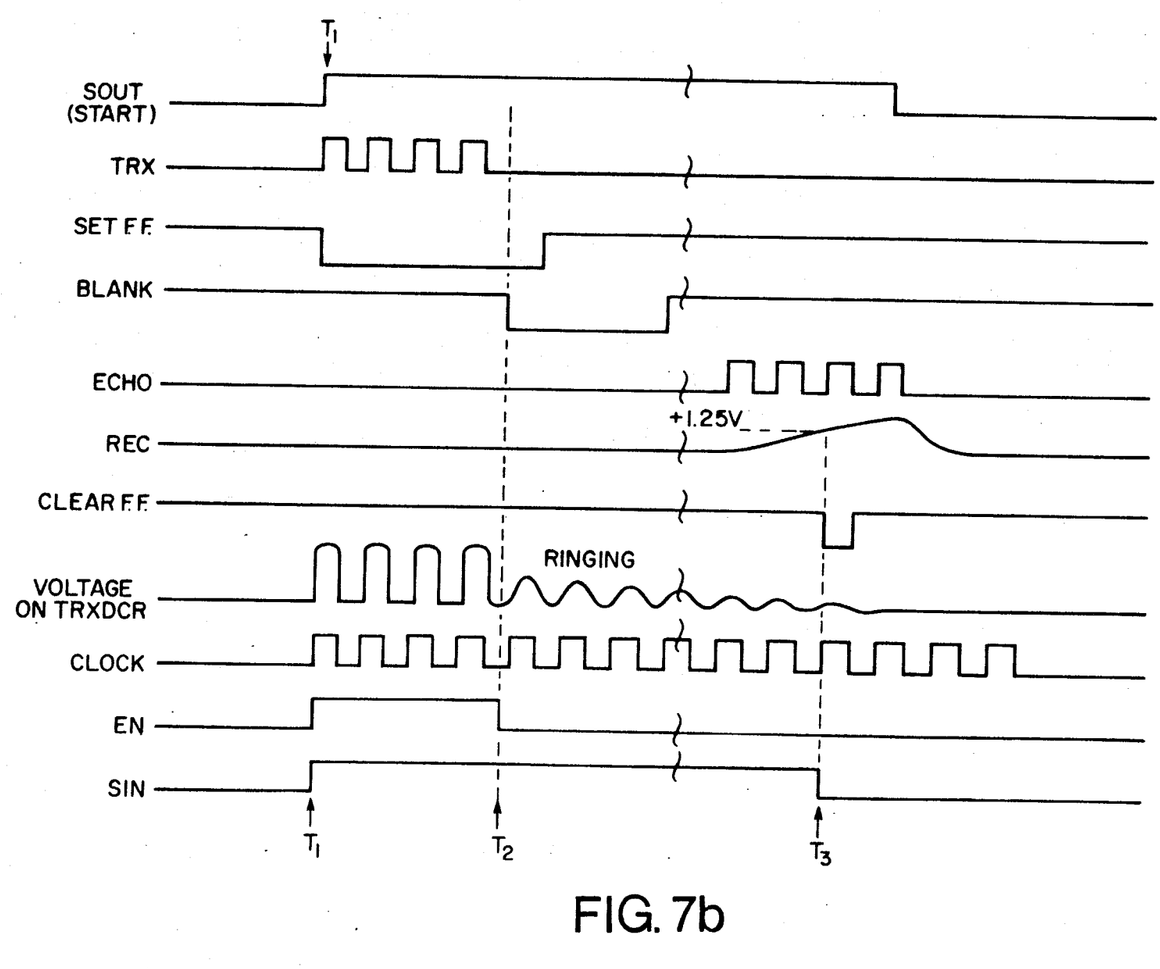
FIG. 7B is a timing diagram showing the relationship of various signals indicated in FIG. 7A.

The operation of module 330 may be better understood with reference to the timing diagrams of FIG. 7B. When the SOUT signal occurs, it provides a start signal which rises at time $T_1$. The start signal causes the set signal on the flip-flop to go low, while simultaneously turning on the clock signal for the enable signal and the SIN signal, all at time $T_1$. The enable signal returns to zero at time $T_2$ so that only one pulse comprised of four pulse segments is passed to the transformer drivers as signal TRX. The actual voltage at the transducer as a result of the TRX input is indicated by the signal labelled voltage on TRXDCR. There it can be seen that after the fourth pulse ends a ringing pattern continues on. It is only after the ringing pattern ends that it is safe to look for a returning echo pulse. The echo pulse, like the TRX pulse, actually includes four pulse segments.

Figure 8:
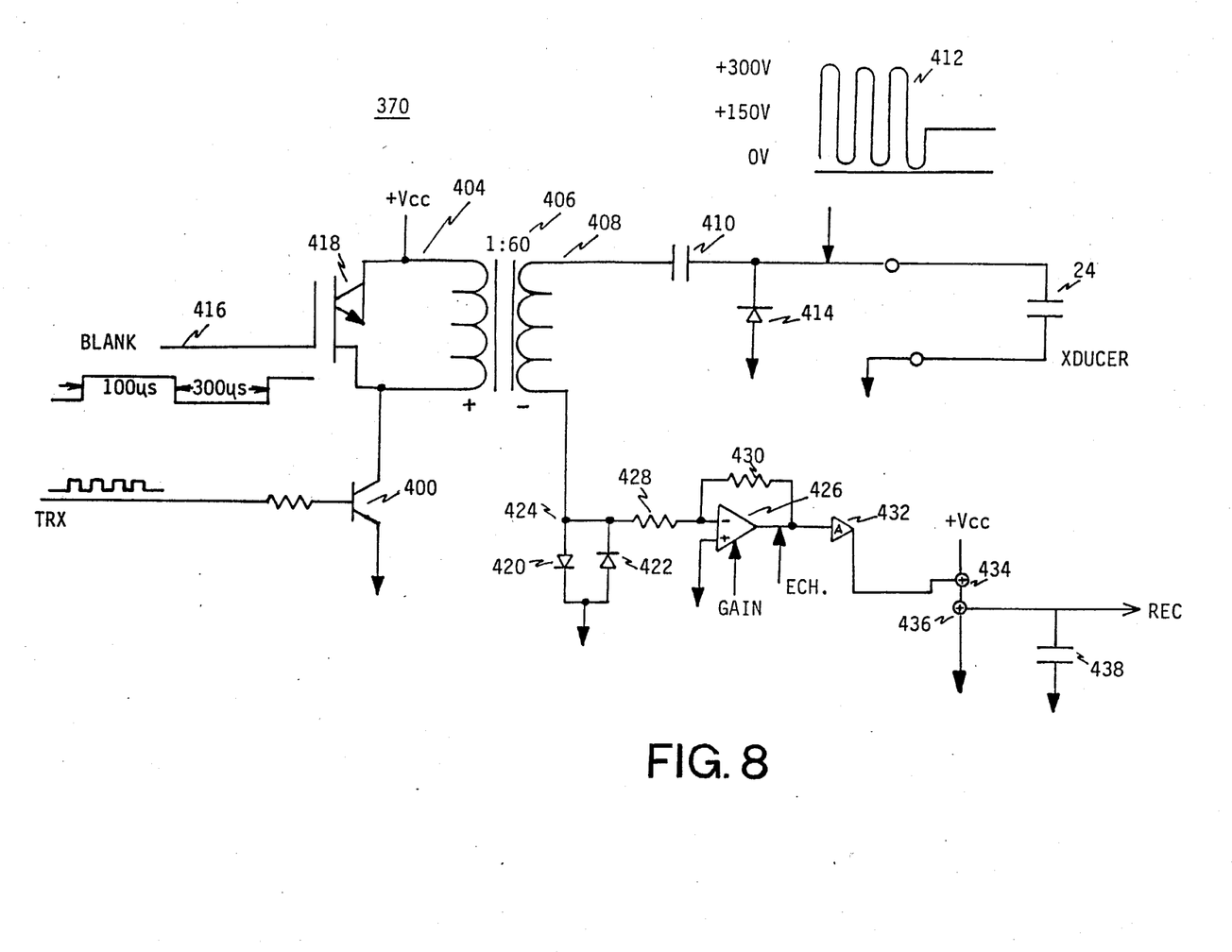
FIG. 8 is a more detailed schematic of the transformer drivers of FIG. 7.

As these four pulse segments are returned they are integrated in the ramp function shown as the REC signal. When the ramp reaches a predetermined voltage such as 1.25 volts, the reception of the echo is complete and the clear signal is sent from voltage comparator 374 to flip-flop 376. At this time also the SIN signal returns to zero, and finally sometime thereafter the SOUT signal returns to zero. The transformer driver circuit which damps the ringing and permits the circuit to accept the returning echo at a much earlier time, therefore allowing much shorter ranging, is shown in FIG. 8.

Within the first 100 microseconds after the SOUT signal, the TRX signal appears on the base of transistor 400 through resistor 402. This causes transistor 400 to trigger and close the circuit from +Vcc through the primary low-voltage winding 404 of transformer 406. The signal that appears on the high voltage secondary 408 is AC coupled through capacitor 410 to ultrasonic transducer 24. At this point the TRX signal appears as a drive signal 412 and causes transducer 24 to emit an ultrasonic pulse or group of pulse segments, and clamping diode 414 is used to maintain a 150-volt bias on the transducer so that the returning echo pulse can be detected. While normally signal 412 would ring for five or six hundred microseconds, this does not occur because immediately after the 100 microsecond period during which the TRX signal was developed, a blanking signal occurs on line 416 which fires FET 418, causing primary winding 404 to be shunted. This immediately damps the ringing which would follow a drive signal 412 and eliminates any possiblity of confusion between the drive signal and its returning echo signal. A pair of diodes 420, 422 connected between secondary winding 408 and ground act to hold the lower end 424 of secondary winding at 0.7 volts, which is the cut-in voltage of the diodes. This protects amplifier 426. The diodes also act to reduce to the 0.7 volt level any ringing; however, as indicated previously, since the echo pulse will normally be in the 100 millivolt range, this is still much too great, and it is therefore the shunt connection across primary winding 404 which provides a clear, early window for receiving short-range echo pulses. When the echo pulse is received it is transmitted through resistor 428 to amplifier 426, which has associated with it a feedback resistor 430. There may be a second stage of amplification 432 before the signal is provided through two current generators 434 and 436 to integrator capacitor 438. It is capacitor 438 that provides the REC signal shown in FIG. 7B. The echo signal pictured in FIG. 7B actually occurs at the output of amplifer 426. Amplifier 426 also may include a gain input, whereby the gain of the amplifier is automatically increased as the time of the SIN signal which defines the range increases. Thus when the target is farther away and the returning echo signal will be weaker, the gain is turned up. Thus with this circuit the present 500–600 microsecond period required to reduce the ringing from the 0.7 volt range to the 1 millivolt range is reduced to approximately 0.1 millisecond to provide a faster window for the return of the shorter-ranging echo pulse. Without the FET 418, the transducer and the resonant circuit formed by the transducer capacitance (400 pf), resistor 428, and transformer 406, will continue to ring for about 600 microseconds, preventing echo ranging at less than approximately ten inches. With the FET, ringing is damped out by the reflected impedance of FET 418 in about 100–250 microseconds, after which FET turns off and allows the echos to be received normally.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. An ultrasonic ranging system comprising:
   transformer means;
   means for selectively energizing said transformer means to produce a transducer drive signal, including timing means for generating a transmission period during which said transformer means is energized;
   an ultrasonic transducer for transmitting an ultrasonic pulse in response to said drive signal and for developing an echo signal upon receipt of an echo pulse derived from said ultrasonic pulse;
   damping means including a shunt switch connected across a winding of said transformer; and
   means, responsive to said timing means, for selectively closing said shunt switch at the end of said transmission period and quickly dampling the ringing following the transssmission of an ultrasonic pulse to a level substantially below the level of the echo signal to permit close ranging.

2. The ultrasonic ranging system of claim 1 in which said transformer has low voltage winding and a high voltage winding and said shunt switch is connected with the low voltage winding of said transformer and said transducer is coupled to said high voltage winding of said transformer.

3. The ultrasonic ranging system of claim 2 further including clamping means for clamping said high-voltage winding close to ground and to the level of said echo signal.

4. The ultrasonic ranging system of claim 1 further including means for generating a range signal from said echo signal.

5. The ultrasonic ranging system of claim 4 in which said means for generating a range signal includes an integrating circuit for integrating said echo signal.

6. The ultrasonic ranging system of claim 5 further including a comparator for providing a reset signal when said integrating circuit output reaches a predetermined level.

7. The ultrasonic ranging system of claim 6 in which said means for generating a range signal includes a gating circuit which is set by said drive signal and reset by said comparator when said output of said integrating circuit reads said predetermined level to provide a range signal defined by said set and reset times.

8. The ultrasonic ranging system of claim 1 in which said ultrasonic pulse includes a plurality of pulse signals.

9. The ultrasonic ranging system of claim 1 in which said means for selectively energizing further includes clock means for providing a drive timing signal to energize said transformer means.

10. The ultrasonic ranging system of claim 9 in which said means for selectively energizing further includes gate means, connected to said clock means, for passing said drive timing signal to said transformer means when enabled by said timing means during said transmission period.

11. The ultrasonic ranging system of claim 9 in which said clock means provides a plurality of drive timing pulses as said drive timing signal.

12. An ultrasonic ranging system for a vehicle including a plurality of channels, each channel comprising:
   transformer means;
   means for selectively energizing said transformer means to produce a transducer drive signal, including timing means for generating a transmission period during which said transformer means is energized, clock means for providing a drive timing signal to energize said transformer means, and gate means, connected to said clock mean, for passing said drive timing signal to said transformer means when enabled by said timing means during said transmission period;
   an ultrasonic transducer for transmitting an ultrasonic pulse in response to said drive signal and for developing an echo signal upon receipt of an echo pulse derived from said ultrasonic pulse;
   damping means including a shunt switch connected across a winding of said transformer; and
   means, responsive to said timing means, for selectively closing said shunt switch at the end said transmission period and quickly damping the ringing following the transmission of an ultrasonic pulse to a level substantially below the level of the echo signal to permit close ranging.

13. The ultrasonic ranging system of claim 12 in which said clock means provides a plurality of drive timing pulses as said drive timing signal.

14. An ultrasonic ranging system including a plurality of channels, each channel comprising:
   transformer means;
   means for selectively energizing said transformer means to produce a transducer drive signal, including timing means for generating a transmission period during which said transformer means is energized, and clock means for providing a drive timing signal to energize said transformer means;
   an ultrasonic transducer for transmitting an ultrasonic pulse in response to said drive signal and for developing an echo signal upon receipt of an echo pulse derived from said ultrasonic pulse;
   damping means including a shunt switch connected across a winding of said transformer; and
   means, responsive to said timing means, for selectively closing said shunt switch at the end of said transmission period and quickly dampling the ringing following the transmission of an ultrasonic pulse to a level substantially below the level of the echo signal to permit close ranging.

* * * * *